Aug. 18, 1942.  C. L. EKSERGIAN  2,293,600
BRAKE MECHANISM
Filed May 25, 1940  2 Sheets-Sheet 2
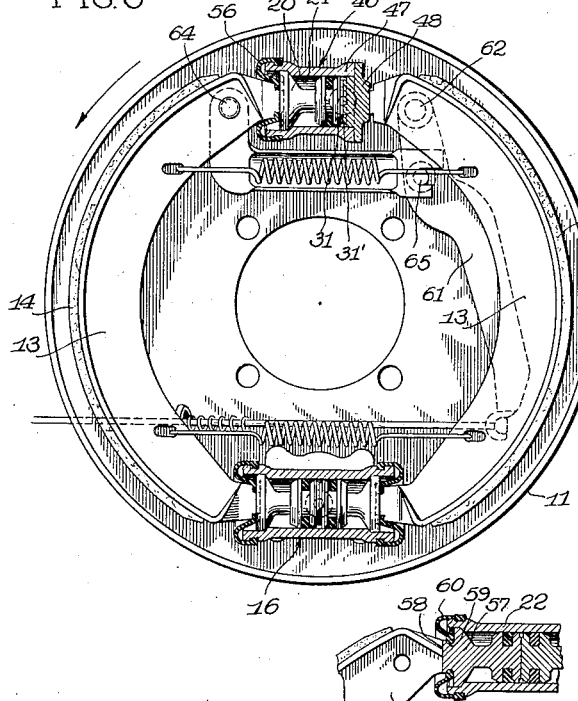
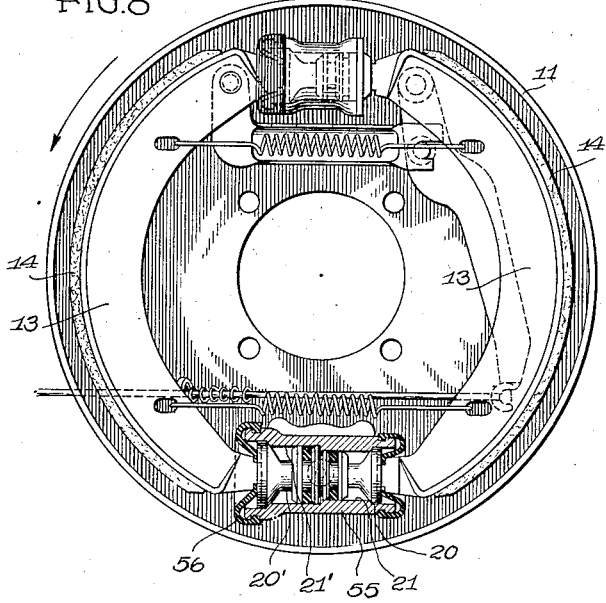
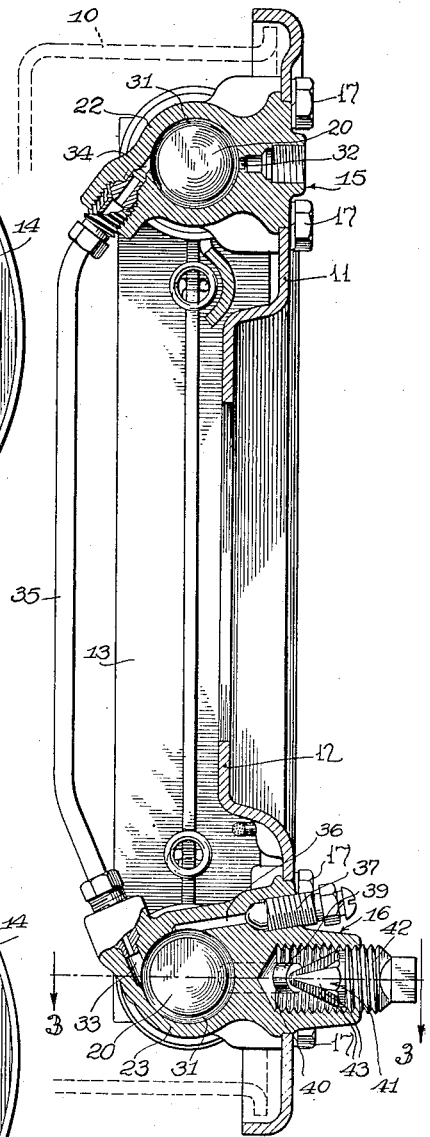
INVENTOR
Carolus L. Eksergian
BY John P. Tarbot
ATTORNEY Patented Aug. 18, 1942

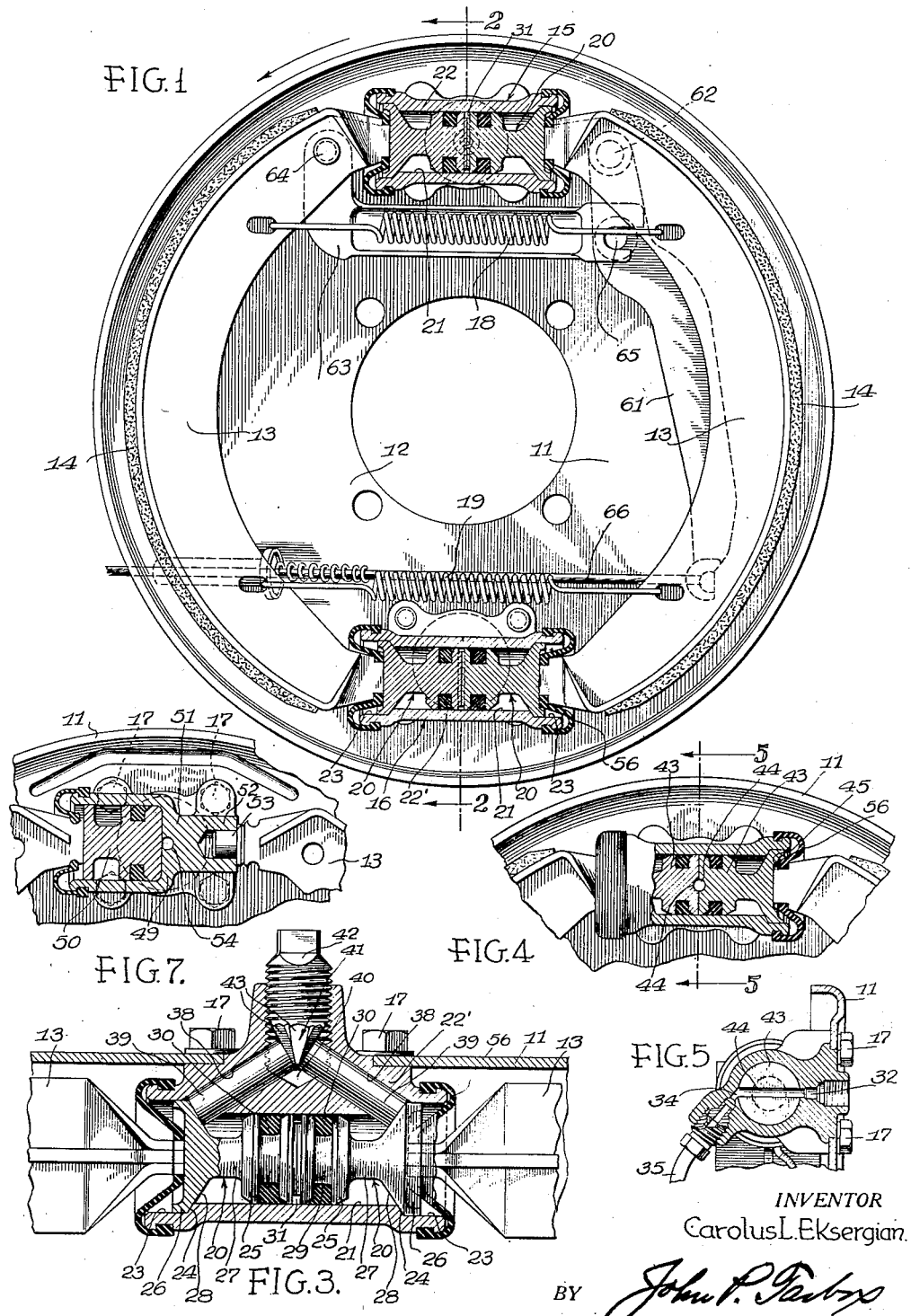

2,293,600

UNITED STATES PATENT OFFICE 2,293,600

BRAKE MECHANISM

Carolus L. Eksergian, Detroit, Mich., assignor to Budd Wheel Company, Philadelphia, Pa., a corporation of Pennsylvania Application May 25, 1940, Serial No. 337,257

17 Claims. (Cl. 188—152)

The invention relates to brake mechanisms and particularly to such mechanisms of the fluid- or hydraulically-actuated type.

It is among the objects of the invention to generally simplify the brake mechanisms of this class, to provide a structure which results in more uniform wear of the shoes, thus making for longer life of the brakes without relining, to provide a simple and rugged mechanism for simultaneously adjusting the shoes for wear, to provide for ease of assembly and disassembly of the parts, and to provide for ease and rapidity of filling or bleeding the system with fluid without the danger of trapping of air in the system.

These and other objects and advantages are attained by the brake mechanism which will now be described in detail in connection with the drawings forming a part of this specification.

In the drawings:

Fig. 1 is an inside elevational view of the backing plate with the brake shoes and operating means mounted thereon, parts being shown in section;

Fig. 2 is an enlarged sectional view of the parts shown in Fig. 1 taken substantially along the line 2—2 of Fig. 1, the brake drum being indicated in dotted lines;

Fig. 3 is a detail sectional view taken substantially along the line 3—3 of Fig. 2;

Fig. 4 is a fragmentary elevational view, parts being in section, showing a modified piston arrangement;

Fig. 5 is a fragmentary sectional view taken substantially along the line 5—5 of Fig. 4;

Fig. 6 is a view similar to Fig. 1, but on a smaller scale, of a modified form of actuating means;

Fig. 7 is an enlarged fragmentary sectional view through a modified form of cylinder which may be used in the form of Fig. 6;

Fig. 8 is a view similar to Fig. 1, on the same scale as Fig. 6, of a third modification of the actuating means; and Fig. 9 is a detail sectional view showing a modified form of sealing arrangement for the end of the cylinder.

In the drawings, the brake drum rotating with the wheel is indicated by numeral 10 and the brake mechanism cooperating therewith in applying the brake is shown mounted on the backing plate 11 which may be secured in the usual manner, through the offset flange 12 around its central opening, to a fixed axle housing or steering knuckle or other non-rotatable part of a vehicle. In all the figures, the direction of rotation of the drum in the forward movement of the vehicle is indicated by the arrows as being counterclockwise.

According to a preferred form of the invention as shown in Figs. 1 to 3, the brake shoes 13 carrying, on their faces adjacent the drum, the friction lining 14, are made interchangeable and are symmetrically arranged on opposite sides of a vertical central plane through the axis of the backing plate. Top and bottom cylinder and piston assemblies, designated generally by reference characters 15 and 16, respectively, are rigidly secured as by bolts 17 to the backing plate 11. The ends of the shoes floatingly abut the pistons 20 of these assemblies and are normally moved to, and held in, their inoperative positions with the friction lining 14 spaced from the drum by means, such as the tensioned coil springs 18 and 19, interconnecting the shoes adjacent their upper and lower ends, respectively. Thus, the cylinder and piston assemblies form the anchors for the heel ends of the shoes, and the floating connection permits the anchored or heel ends to move radially outwardly, so that the friction lining engages the drum throughout with a substantially uniform pressure, and thus insures general uniformity of wear throughout.

To secure simplicity of manufacture, all the pistons, designated 20, may be made alike and fit corresponding bores 21 in the respective cylinders 22 and 22'. The bores 21 of the cylinders 22 and 22', which may be cast cylinders, are of enlarged diameter adjacent their ends, as at 23, and inclined shoulders 24 are formed where the smaller diameter bore merges into the larger. These shoulders form stops limiting the inward movement of the pistons 20. The pistons are each formed of an inner small diameter portion 25 fitting the small diameter portion of the bore 21 of the cylinder and an enlarged outer end portion 26 fitting the large diameter portion 23 of the bore 21, and the portions 25 and 26 are connected by a reduced neck portion 27 forming an annular recess between the piston and cylinder wall. The inner face 28 of the piston portion 26 is inclined similarly to the shoulder 24 on the cylinder and is adapted to engage said shoulder to limit the inward movement of the piston. The annular recess considerably lightens the piston. The smaller diameter portion 25 of the piston is provided with an annular groove 29 in which is seated a sealing ring 30 of rubber or the like.

When the two pistons of a cylinder are in their inner positions with the inclined faces 28 thereof up against the inclined shoulders 24 at the opposite ends of the cylinder bore 21, their inner flat ends are in substantial abutting relation. The inner end of each piston is preferably formed with a shallow peripheral annular recess 31, and when the two pistons are in their inner abutting position, the two recesses merge to form a shallow annular channel. The upper cylinder 22 is provided with a fluid supply port 32, the inner end of which communicates with the annular channel formed by recesses 31, 31 between the pistons, and the outer end of which may be connected to a suitable conduit through which fluid may be supplied under pressure in a usual manner. The lower cylinder 22' is provided with a supply port, as 33, communicating with the space between the pistons, and the outer end of this port is connected with an outlet port 34 in the upper cylinder opening to the annular recess 31, 31 between the pistons at a point substantially diametrically opposite the opening of the supply port 32. This connection may comprise a conduit 35 secured by suitable fittings to the respective outlet and supply ports on the cylinders. From the top of the central portion of the lower cylinder 22' a bleeding port 36 extends to the atmosphere, but is normally closed by a suitable plug 37.

To facilitate the filling or bleeding of the system rapidly without danger of pocketing of air in the system, the combined cross-sectional area of the divided passage formed by the annular channel 31, 31 formed by the two pistons of the top cylinder 22, which are always in substantial contact during filling, is approximately the same as the cross-section of the supply port 32, of the outlet port 34 and of the opening in the conduit 35, so that when the bleeding plug 37 is removed, the fluid can be rapidly introduced through the supply port 32 and pushes the air out before it as it advances to quickly fill the channel 31, 31 in the top cylinder, the outlet port 34, the conduit 35, the supply port 33 of the lower cylinder, the space between the pistons and the bleeding port 36. After the system is so filled or bled, the bleeding port is closed by screwing home the plug 37.

The invention contemplates the provision of simplified means for adjusting the return to inoperative position of the shoes, either initially, or to compensate for wear. This means may be associated with but one of the cylinder and piston assemblies, and preferably, as shown, it is associated with the lower one 16. It is formed as a unit with this lower cylinder and piston assembly.

As shown in Fig. 3, the casting 22' in which the lower cylinder bore 21 is formed has inclined bores 38 intersecting the cylinder bore 21 at points normally outside the limit of outward movement of the inner portions 25 of the pistons, i. e. outside the fluid pressure chamber formed by the cylinder and pistons. In these bores 38 are mounted for sliding movement the pins 39, the remote ends of which project into the cylinder bore 21 and abut, respectively, the inclined faces 28 of the outer large diameter portions 26 of the pistons 20. The adjacent ends of the inclined bores 38 intersect the diametrically opposite sides of a screw-threaded bore 40 extending from the outside of the cylinder casting but terminating short of the cylinder bore 21 and extending at right angles thereto. The adjacent ends of the pins 39 project into the bore 40 into the path of a generally conical inner end 41 of an adjustment plug 42 screwed into the screw-threaded portion of the bore 40, this adjustment plug having an outer squared or otherwise shaped end adapted to receive a wrench for readily turning it.

From this it will be seen that the pistons 20, and through them the shoes 13, may be simultaneously adjusted outwardly by turning the adjustment plug 42 to screw it into the bore 40, the coned face of the plug acting through the pins 39 upon the pistons. Also, the coned face of the plug is preferably formed with flat facets 43 so that the pressure of the ends of the pins upon these flat facets maintains the plug 42 in adjusted position. Since the shoes are supported on the piston to permit floating movement of the shoes in the plane of the brake mechanism, adjustment at one cylinder is sufficient to adjust both shoes for wear.

The operation of the braking mechanism so constructed will now be briefly described, assuming the vehicle is travelling forward and the drum rotating in the counter-clockwise direction indicated by the arrow, Fig. 1. Fluid under pressure is introduced into the closed chambers formed by the cylinder bores 21 and the associated pistons 20, and the first effect is to move all four pistons outwardly until the shoes 13 engage the brake drum 10. The self-energizing action of the shoes, after the frictional force between them and the brake drum has built up to a degree greater than the pressure of the pistons at the heel ends of the shoes, causes the shoes to move circumferentially in the direction of rotation of the drum until the pistons engaging their heel ends are forced back by the superior frictional force until, in the case of the upper cylinder, the inclined face 28 comes against the inclined shoulder 24 on the cylinder, and, in the case of the lower cylinder, against said shoulder 24 or against the end of the adjusting pin 39, if the latter has been adjusted beyond the shoulder 24. In either case, the heel ends of the shoes 13 are solidly anchored on the cylinders 22 and 22' against rotation, but are free to move radially outward by reason of the floating connection of the shoe ends with the pistons. The entire friction surface of each of the shoes is thus pressed with substantially uniform force against the drum due to the pressure of the pistons 20 on the toe ends and the self-energizing action of the shoes, thus insuring maximum braking and substantially uniform wear. With the symmetrical arrangement shown, the braking in reverse is equally efficient with the braking in forward movement. The shoes 13 and their operating means act in the same manner as in forward braking, except that the heel and toe end of the shoes are reversed and the shoes are anchored at the opposite ends of the cylinders. If adjustment for wear is desired, both shoes are readily simultaneously adjusted by screwing in the adjusting plug 42.

In Figs. 4 and 5, there is shown a slightly modified form of piston 43 insuring the use of a minimum of fluid in the cylinders, particularly the upper cylinder 22, with which no adjustment is provided. According to this modification, the abutting flat inner faces of the pistons 43 are formed with mating semi-circular channels 44 extending diametrically between the supply and outlet ports 32 and 34, the cross-section of the orifice formed by these semi-circular channels corresponding to the orifice of the ports and conduits of the system. This arrangement is preferable to the piston arrangement shown in Fig. 1 since it still further speeds up the bleeding operation and provides more positive insurance against trapping of air in this operation. Ordinarily, this construction of pistons needs only be used with the upper cylinder, since after adjustment has been made in the lower cylinder, the pistons no longer return to their abutting relation although, for convenience of manufacture, the pistons in the upper and lower cylinders may be identical in this form, as the form of Figs. 1 to 3. In this form, in order to keep the orifice formed by the pistons aligned with the ports 32 and 34 in the cylinder, each of the pistons is held against rotation by the engagement of the end of a shoe 13 in a vertical slot as 45 formed in the outer face of the piston.

Where equal braking in forward and reverse is not deemed essential, as is true of most passenger car vehicles which use the brakes in reverse very little compared with the forward braking, the form of the invention shown in Fig. 6 may be preferred, as this form has the advantage of greater simplicity and somewhat decreased cost. In this form, the bottom cylinder and piston assembly 16 may be the same as in the preferred form of Figs. 1 to 3, but the top cylinder and piston assembly 46 comprises a cylinder 47 closed at one end, and piston pointing in a direction the reverse of the forward movement of the drum, as indicated by the arrow, and open at its opposite end, with a single piston 20 movably mounted in its bore 21 and having its flat inner face engage the flat inner face of the head 48 when the piston is in its inner inoperative position. The adjacent ends of the shoes 13 floatingly bear, the one on the head of the cylinder and the other on the outer face of the piston. To avoid multiplicity of different parts, the pistons for top and bottom cylinders may all be made alike, as shown in Fig. 1, and the portion of the head 48 of the cylinder fitting the bore 21 may be formed with an annular recess 31' mating the recess 31 on the piston, the supply and exhaust ports being aligned with the annular channel so produced as in the form of Figs. 1 to 3.

To secure greater simplicity of the top cylinder provided with a single piston and to secure equal bleeding advantages to the form shown in Figs. 4 and 5, a modified form as shown in Fig. 7 may be used. According to this form, the bore of the cylinder 49 is of uniform diameter and the piston 50 is of simplified construction and is lightened by a deep annular recess between its inner and outer portions bearing against the bore. The inner face of the piston is plain and bears in idle position against the plain face of the cylinder head 51 which is, in this case, integral with the cylinder and provided with an extension 52. A hardened plug 53 is secured in the extension and serves as a floating anchor connection for the heel end of the right-hand shoe 13. The fluid supply and outlet port may be a continuous bore 54 extending from side to side of the cylinder walls and intersecting the inner end face of the bore, so as to communicate with the space between the end of the piston and the end of the bore of the cylinder.

The operation of this two-cylinder, three-piston arrangement of the brake mechanism, as shown in Figs. 6 and 7, is the same in forward braking as the form shown in Figs. 1 to 3, except that the right-hand one of the shoes 13 which bears against the cylinder head is always solidly anchored against said head and this shoe is not shifted circumferentially after the brake shoes engage the drum. The braking action for forward braking is equally efficient to that of the form of Figs. 1 to 3. In reverse braking, however, only one of the shoes, the left-hand one, acts with equal efficiency in reverse as in forward braking. The other shoe, not being self-energizing, acts with less efficiency in reverse from its efficiency in forward braking. However, because reverse braking is relatively infrequently required in passenger car operation or is usually taken care of by a separate emergency brake, this form may be preferred in many cases because of its simplicity and resultant greater economy in manufacture.

Moreover, the modification of Fig. 8 provides a construction in which the forward braking is equally efficient with that of the construction of Figs. 1 to 3, and the braking in reverse is somewhat improved over that of Figs. 6 and 7. In this form, the left-hand piston 20' and bore 21' of the lower cylinder 55 are made of somewhat larger diameter than the right-hand bore 21 and piston 20, the diameter of the right-hand bore and piston being the same as in the form of Figs. 1 to 3. The diameter of the bore of the upper cylinder and piston may also correspond to the right-hand bore and piston of the lower cylinders as indicated in dotted lines. With this modification, in forward braking, the shoes are both self-energizing and are pressed out at their toe ends with equal force, while their heel ends are anchored on the cylinders. In reverse braking, the larger diameter piston 20' moves the now toe end of the left-hand shoe out with greater force, and since this shoe is self-energizing in reverse braking as well as in forward braking, its braking action is increased in reverse over that in forward braking. The action of the right-hand shoe is the same as in the form of Figs. 6 and 7, but the total braking force in reverse is greater than in that form and may be even as great as in forward braking. Since comparatively little braking takes place in reverse in normal passenger car operation, the added wear on the left-hand shoe because of its greater braking force in reverse would be negligible.

In all the forms so far described, dust and dirt may be excluded from the end of the cylinders and pistons by providing a flexible sealing boot, as 56, between each of the open ends of the cylinders and the adjacent shoe end. To facilitate the assembly of the shoes and cylinder units, it is preferable to provide the sealing boot arrangement shown in Fig. 9. In this arrangement, the piston, as 57, is formed with a central projection 58 against which the shoe 13 bears, and the periphery of this projection is furnished with a groove 59, a similar groove being formed on the outside of the end of the cylinder, as 22, and the flexible sealing boot, as 60, extends between the grooves in the piston and cylinder and is entirely free of the shoe. The advantage of this arrangement for assembly and disassembly of the brake mechanism is apparent, since the boot thus forms a part of the cylinder and piston assembly and is entirely free of the shoe.

A usual form of emergency brake is shown in all the forms as comprising a lever 61 pivoted at 62 adjacent the end of the right-hand shoe and connected to the left-hand shoe through a link 63 pivoted at one end thereof through pivot 64 near the adjacent end of the left-hand shoe and secured at its opposite end by a lost motion connection, such as the slot and pin connection indicated at 65 to an intermediate portion of the lever 61. The lever 61 is operated to apply the brakes through the connections just described by means such as a cable 66, connected to its free end.

The invention has herein been described in several embodiments, but it will be understood that further changes and modifications might be made by those skilled in the art without departing from the spirit of the invention, and such changes and modifications are intended to be included within the scope of the appended claims.

What is claimed is:

1. A brake mechanism comprising a backing plate, a pair of brake shoes movably mounted thereon, actuating means for the shoes for moving them into brake applying position, said actuating means including a cylinder mounted on the backing plate and disposed between adjacent ends of said shoes, pistons in said cylinder, one engaging each of said adjacent shoe ends, means for admitting fluid under pressure into the chamber formed by the cylinder and pistons to move the pistons outwardly and the shoes to brake applying position, means for returning the shoes and pistons to inoperative position, and common manually controlled means for simultaneously adjusting the return stop position of the shoes, said adjusting means being mounted on the cylinder and acting on the pistons outside the fluid pressure chamber thereof.

2. A brake mechanism according to claim 1, in which each of the pistons is formed with a shoulder between its ends, and the adjusting means comprises axially slidable pins engaging said shoulders, and a member for simultaneously actuating said pins.

3. A brake mechanism according to claim 1, in which each of the pistons is formed with a recess between the ends thereof providing a shoulder, and the adjusting means comprises axially slidable pins engaging said shoulders, and a member for simultaneously moving said pins axially.

4. A brake mechanism according to claim 1 in which each of said pistons is formed intermediate its ends with a recess providing a shoulder, and the adjusting means comprises axially slidable pins inclined to the axis of the cylinder and having their remote ends in position to abut said shoulders, and a tapered wedge member extending between the adjacent ends of the pins and movable to simultaneously slide said pins.

5. A brake mechanism according to claim 1, in which each of the pistons is formed with a shoulder between its ends, and the adjusting means comprises axially slidable pins engaging said shoulders at their remote ends, and a common actuator screw having a generally conical face engaging the adjacent ends of said pins, the conical face being divided into flattened sectors, whereby the engagement of the pins with said flattened sectors tends to maintain the screw in adjusted position.

6. A brake mechanism comprising a backing plate, a pair of brake shoes movably mounted thereon and symmetrically arranged on opposite sides of a vertical axial plane through the plate, a pair of actuating cylinders mounted on said backing plate, one between each pair of opposed ends of the shoes, pistons in said cylinders floatingly engaging said shoe ends, means for supplying fluid under pressure to said cylinders to actuate the pistons and through them the shoes to braking position, means for returning the shoes and pistons to inoperative position, and common manually cotrolled adjustable stop means associated with at least one of said cylinders for simultaneously adjusting the return position of the pistons associated therewith, said stop means engaging the pistons outside the fluid pressure chamber formed by the cylinder and pistons.

7. A brake mechanism cylinder unit comprising a cylinder casting having a bore, a pair of pistons slidable in said bore, said pistons each having a recess intermediate their ends forming a shoulder, a pair of bores in said casting extending at an angle to the first bore, and having their axes substantially normal to said shoulders, respectively, pins slidably mounted in said bores, and having their remote ends located for engagement with said shoulders, respectively, their adjacent ends communicating with a bore extending at right angles to the first-named bore, a single screw-threaded adjusting plug having a generally conical wedge face secured in said last-named bore and arranged to engage the adjacent ends of the pins and adjust them simultaneously.

8. A brake mechanism comprising a backing plate, a pair of brake shoes mounted thereon for brake-applying movement, actuating cylinders mounted adjacent the opposite ends of the shoes, pistons in said cylinders, one engaging each shoe end, means for admitting fluid pressure to said cylinders to actuate said pistons and shoes, means for returning said shoes to inoperative position, limit stops between each piston and its cylinder for limiting the return movement of said piston and the associated shoe end, said stops alternately forming the anchors for the shoes depending upon the direction of rotation of the braking member engaged by the shoes, the stops associated with at least one of the cylinders being commonly manually adjustable.

9. A brake mechanism according to claim 8 in which the stop between piston and cylinder is formed by an enlarged bore in the end of the cylinder, and a correspondingly enlarged portion of the piston for engaging the shoulder formed by the enlarged bore of the cylinder.

10. A brake mechanism comprising a backing plate, a pair of brake shoes movably mounted thereon and symmetrically arranged on opposite sides of a vertical plane through the plate, a pair of actuating cylinders mounted on said backing plate, one between each pair of shoe ends, one of said cylinders being a two-piston cylinder, one piston for engagement with each of the adjacent shoe ends, the shoes being adapted to anchor on one or the other of said pistons depending on the direction of rotation of the drum, and the other of said cylinders being a single-piston cylinder and having a head at one end for anchoring engagement with an adjacent shoe end and a piston for engagement with the other adjacent shoe end, means for supplying fluid under pressure to said cylinders to actuate the pistons and through them the brake shoes to braking position, and means for returning the shoes to inoperative position.

11. A brake mechanism according to claim 10 in which common manually adjustable stop means are associated with the two-piston cylinder for simultaneously adjusting the return position of the pistons associated therewith.

12. A brake mechanism according to claim 10, in which the two-piston cylinder has its opposite ends of different diameter bores, and the pistons mounted in said bores of correspondingly different diameters, the piston of larger diameter acting on the same shoe as the piston of the single-piston cylinder.

13. A brake mechanism comprising a brake shoe, a piston and cylinder for actuating the shoe, a port leading to the bore of said cylinder for supplying fluid under pressure to actuate the shoe, a passage extending diametrically of the cylinder between said piston and the end of the cylinder bore and being in line with and of substantially the same cross-sectional area as said supply port, the opposite end of said passage communicating with an outlet port, whereby bleeding can be carried out rapidly and without trapping of air in the system.

14. A brake mechanism including a backing plate and brake actuating cylinders mounted to extend horizontally at top and bottom of said plate, a piston in said upper cylinder normally returned to its inoperative position, a pair of pistons in said lower cylinder, adjustable stop means for the pistons of said lower pair, a port leading to the bore of said top cylinder for supplying fluid, a passage between said cylinder bore and piston of substantially the same cross-sectional area as said port and in line therewith leading to the opposite side of the cylinder from said supply port, an outlet port on said opposite side communicating with said passage, a fluid conduit connecting said port with the port communicating with the space between the pistons of the lower cylinder and a bleed port communicating with the top of the lower cylinder, all said ports, passages, and conduits being of approximately the same cross-sectional area, whereby the system can be bled rapidly and without trapping air in the system.

15. A brake mechanism comprising a backing plate, a pair of shoes mounted on said plate for movement into braking engagement with a member to be braked, actuating means including a cylinder mounted on said plate and disposed between adjacent ends of the shoes, pistons mounted in said cylinder, one engaging each of said shoe ends, means for moving said shoes and pistons to inoperative position, a supply port opening to the space between the pistons, the space between said pistons when in inoperative position providing a passage between the pistons of a cross-sectional area substantially equal to that of the port, and leading on the opposite side of the cylinder to an outlet port leading to a second brake cylinder, having opposed pistons, and connecting into the space between the pistons in said second brake cylinder, and a bleed port communicating with the top of said second cylinder whereby the system can be bled rapidly without the trapping of air.

16. A brake mechanism according to claim 15, in which the passage between the pistons is formed by opposed semi-circular channels in the abutting faces of the pistons, and means for preventing rotation of the pistons in the cylinders to maintain said channels aligned with the supply and outlet ports of the cylinder.

17. A brake mechanism comprising a backing plate, a brake shoe mounted thereon, means for actuating said shoe into braking engagement with the member to be braked and means for returning the shoe to inoperative position, said actuating means including a unitary cylinder casting having a bore extending from a closed head end to the opposite end of the cylinder, a piston in said bore engaging an end of the brake shoe, said piston when in inoperative position abutting the inner face of the head end of the cylinder, and a passage for admitting fluid under pressure between the cylinder head and piston extending transversely of said head and formed entirely in said head and opening at opposite sides of the head, said passage being of substantially uniform cross-section throughout, a supply conduit connected to one end of said passage and a conduit leading to another brake cylinder connected to the other end, the conduits being of substantially the cross-sectional area of said passage.

CAROLUS L. EKSERGIAN.